United States Patent Office 2,929,816
Patented Mar. 22, 1960

2,929,816

CHLORINATED MELAMINE CYANURATE

Ralph J. Chamberlain, Stamford, Conn., assignor to American Cyanamid Company, New York, N.Y., a corporation of Maine No Drawing. Application February 3, 1958
Serial No. 712,664

3 Claims. (Cl. 260—249.6)

The present invention relates to a novel group of new compounds. More specifically, it is concerned with halogenated melamine cyanurates having a high content of available halogen.

Various halogenated hydrocarbons from which the halogen is readily liberated have been proposed for various uses. Their commercial importance, for example, in bleaching and sanitizing preparation is steadily increasing. Many of the previously proposed compounds are not wholly satisfactory for various reasons such as being too low in available halogen content, too unstable in storage and the like. It is, therefore, the primary object of the present invention to provide compounds which are not subject to these limitations. This has been accomplished by the halogenated melamine compounds of the present invention.

Several different structural formulae for the novel compounds of the present invention may be postulated. However, it is believed that they may be represented most accurately by the structural formula:

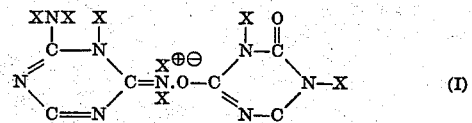

wherein X may be hydrogen or a halogen but at least four X's are halogen. This representation will therefore be used in the present discussion. In this discussion the term "halogen" is used to denote chlorine or bromine only.

Compounds of the present invention may be readily prepared. As the preferred mode of operation, melamine cyanurate is admixed with water containing a water-soluble, alkalizing agent such as sodium or potassium hydroxide or salts such as sodium acetate, sodium carbonate and the like. A cyanurate:alkali-metal mol ratio of at least 1:Y should be used, "Y" being a number from 1 to 9 equal to the number of hydrogens to be replaced by halogen. This mixture should be cooled too and during reaction maintained at as low a temperature as practicable. Below about 10° C. is desirable and below about 5° C. is preferred.

Chlorine or bromine is then introduced into the mixture while maintaining an adequate degree of agitation to insure thorough dissemination of the halogen. Halogen addition may be batch-wise or continuous, at a rate sufficient to maintain active reaction without undue temperature rise. However, a large unreacted halogen excess at any one time should be avoided. Depending upon the weight of cyanurate being treated, the desired degree of halogenation and the cooling capacity available; reaction periods will range from about one-half to about five hours. This procedure may be further demonstrated in conjunction with the following examples which are intended as illustrative only.

Example 1

About 1 mol part of melamine cyanurate is added to an aqueous solution containing 9 mol parts of sodium hydroxide. Resultant slurry is cooled to about 0° C. and with thorough agitation about 20 mol parts of chlorine gas is added thereto over a period of about 45 minutes while maintaining the slurry temperature below about 5° C. The solids content of the reacted slurry is collected, washed with cold water, and assayed. Product yellow solid is obtained in high yield and shows an avialable chlorine content of about nine atoms. The product is substantially insoluble in water and but slowly hydrolyzed. It is stable in storage over long periods. Ultra-violet spectra indicate the structural formula to be that of Formula I above, when 9 X's are chlorine.

In using an alkali metal hydroxide as in Example 1 no special precautions are necessary as to either the initial or terminal pH. Apparently neither is critical. The same procedure therefore may be used when employing salts such as sodium acetate if so desired. In the latter case, however, somewhat better results may be obtained by adjusting the solution to about pH 6.5–6.8 with acetic acid before feeding in the halogen. In such cases the terminal pH is about 2–2.5 after complete halogenation.

Because the amount of alkali is not necessarily critical, when a lower degree of halogenation is desired it is quite feasible to use the cyanurate:caustic ratio of about 1:9 used for complete chlorination and simply stop the halogenation at the desired content. This is shown in the following examples.

Examples 2 and 3

Example 1 is repeated feeding different proportions of chlorine. Typical proportions and results are shown in the following table in which mol ratios are indicated on a basis of one mol part of melamine cyanurate. The yields indicated are in weight percent. Results obtained in Example 1 are also given for purposes of comparison.

| Example Number | Reaction | | Product— Available Chlorine | | Yield |
|---|---|---|---|---|---|
| | Time (Hours) | Temp., 0° C. (Av.) | Atoms (Av.) | Percent | |
| 1 | 0.75 | 5 | 9 | 113 | 81 |
| 2 | 4.5 | 5 | 7 | 98 | 87 |
| 3 | 3.0 | 5 | 4 | 76 | 55 |

Study of the ultra-violet spectra of the products of the above table, indicates that although the product of Example 1 is made up principally of a single component, those of the other Examples 2 and 3 are indicated to be mixtures wherein it is not possible to assign definite locations to the halogen slurrying substituents. Nor does there appear to be a definite order of substitution. Therefore, in the foregoing table, the number of chlorine atoms is shown as an "average," based on the weight percent found by assay.

Example 4

The halogenated compounds of the present invention are useful in various ways. For example, they may be made up into dry bleaching compositions with conventional materials. A typical illustrative composition contains, by weight about 10 parts of halogenated compound, about 1 part of sodium toluene sulfonate, about 5 parts of sodium metasilicate, about 25 parts of sodium tripolyphosphate and about 60 parts of sodium sulfate. Other known wetting agents, silicates and phosphates may be substituted for the sulfonate salt, metasilicate and tripolyphosphate.

I claim:
1. As a new composition of matter, storage-stable halogenated melamine cyanurate of the formula:

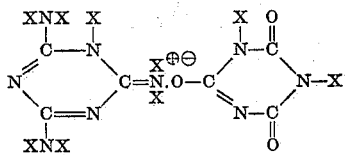

wherein each X is selected from the group consisting of hydrogen, chlorine, and bromine, at least four X's being said halogen.

2. As a new compound, chlorinated melamine cyanurate having the formula:

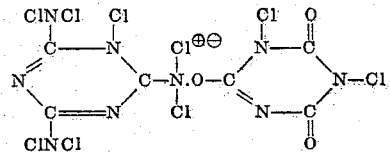

3. A method of making a halogenated melamine cyanurate corresponding to the formula

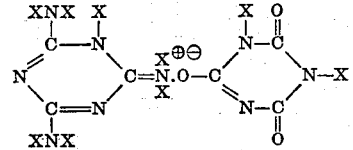

wherein X is selected from the group consisting of hydrogen, chlorine, and bromine, at least 4 X's being one of said halogens of this group, which comprises forming a slurry of melamine cyanurate in water, said slurry containing "Y" mol parts of an alkali metal per mol part of melamine cyanurate, "Y" being a number from 4 to 9 equal to the number of hydrogens of the melamine cyanurate to be replaced by one of said halogens; cooling the resulting slurry to below about 5° C.; adding at least about Y/2 mols of a halogen selected from the above group; and collecting the resultant solid product.

No references cited.